United States Patent
Parupalli et al.

(10) Patent No.: US 11,949,321 B2
(45) Date of Patent: Apr. 2, 2024

(54) PRE-BIASED MODE SWITCHING IN SYSTEM HAVING SELECTABLE PULSE-WIDTH MODULATED (PWM) AND LINEAR OPERATION

(71) Applicant: CIRRUS LOGIC INTERNATIONAL SEMICONDUCTOR LTD., Edinburgh (GB)

(72) Inventors: Vamsikrishna Parupalli, Austin, TX (US); Nishant Jain, Austin, TX (US); Mengde Wang, Austin, TX (US)

(73) Assignee: CIRRUS LOGIC, INC., Austin, TX (US)

(*) Notice: Subject to any disclaimer, the term of this patent is extended or adjusted under 35 U.S.C. 154(b) by 157 days.

(21) Appl. No.: 17/510,707

(22) Filed: Oct. 26, 2021

(65) Prior Publication Data
US 2023/0128810 A1    Apr. 27, 2023

(51) Int. Cl.
| | | |
|---|---|---|
| *H02P 27/00* | (2006.01) | |
| *H02M 1/00* | (2006.01) | |
| *H02M 1/088* | (2006.01) | |
| *H02M 3/28* | (2006.01) | |
| *H02P 27/08* | (2006.01) | |

(52) U.S. Cl.
CPC ......... *H02M 1/0045* (2021.05); *H02M 1/088* (2013.01); *H02P 27/08* (2013.01)

(58) Field of Classification Search
CPC .............................. H02M 1/088; H02P 27/08
See application file for complete search history.

(56) References Cited

U.S. PATENT DOCUMENTS

| | | |
|---|---|---|
| 5,550,450 A | 8/1996 | Palko et al. |
| 6,392,484 B1 * | 5/2002 | Takita ................... H03F 3/217 330/10 |
| 6,757,129 B2 | 6/2004 | Kuroiwa et al. |
| 6,995,537 B1 | 2/2006 | Plutowski et al. |

(Continued)

OTHER PUBLICATIONS

U.S. Appl. No. 17/230,789 entitled Cross-Over Distortionless Pulse-Width Modulated (PWM)/Linear Motor Control System, filed Apr. 14, 2021.

(Continued)

*Primary Examiner* — Kawing Chan
*Assistant Examiner* — Charles S Laughlin
(74) *Attorney, Agent, or Firm* — Mitch Harris, Atty at Law, LLC; Andrew M. Harris

(57) ABSTRACT

An electronic control system provides selectable linear and pulse-width modulated (PWM) operation with reduced disruption when changing from PWM operation to linear operation. The system includes an output stage that has a push-pull driver coupled to the load, which may be a motor, a haptic device, or other device requiring current-mode control. The system also includes a pulse-width modulated (PWM) driver for providing pulse-width modulated drive signals to gates of the transistors of the output stage when a pulse-width modulated mode is selected, and a linear amplifier stage that provides a linear analog signal to the gates of the transistors when a linear mode is selected. A pre-charging circuit pre-charges the gates during a pre-charge cycle that is initiated when the operating mode changes from the PWM operating more to the linear operating mode.

24 Claims, 5 Drawing Sheets

(56) References Cited

U.S. PATENT DOCUMENTS

| | | | |
|---|---|---|---|
| 7,224,135 B1 | 5/2007 | Mengoli | |
| 8,716,959 B2 | 5/2014 | David et al. | |
| 9,219,414 B2 | 12/2015 | Shao | |
| 9,654,689 B2 | 5/2017 | Gleason et al. | |
| 9,735,574 B2 | 8/2017 | Tournatory et al. | |
| 10,996,634 B2 | 5/2021 | Yao et al. | |
| 11,070,177 B2 | 7/2021 | Singh et al. | |
| 11,115,046 B2 | 9/2021 | Parupalli et al. | |
| 2005/0264920 A1* | 12/2005 | Ziemer | G11B 5/5547 360/78.04 |

OTHER PUBLICATIONS

Examination Report under Section 18(3) in GB Application No. GB2213995.0 dated Oct. 20, 2023. (pp. 1-3 in pdf).

* cited by examiner

PRE-BIASED MODE SWITCHING IN SYSTEM HAVING SELECTABLE PULSE-WIDTH MODULATED (PWM) AND LINEAR OPERATION

BACKGROUND

1. Field of Disclosure

The field of representative embodiments of this disclosure relates to motor drivers and other power output electronics, such as haptic drivers that provides selectable operation in either a pulse-width modulated (PWM) or linear operating modes, and in particular to driver circuits in which distortion is reduced or eliminated by controlling the bias of output transistors during a mode switch to linear operating mode.

2. Background

Motor position controllers and other power output drivers such as those for driving haptic feedback devices, a current-mode controller is needed to properly control the operation of the load. The current may be provided with high efficiency using a class-D type output, or low distortion, noise and offset using a linear amplifier. In particular, for motor and haptic controllers, a pulse-width modulated (PWM) output stage has been used in combination with linear output motor control to provide high-efficiency for large excursions and low distortion and offset error by transitioning to a linear control once the motor-driven position is close to the commanded position or for functions such as maintaining image focus (auto-focus) or image stabilization. Such operation enhances accuracy by providing a less noisy environment when the system is in a linear operation mode, while providing high power efficiency for large excursions when the system is in the PWM operating mode. The output stage is typically a push-pull pair of transistors and for cost/area efficiency it is desirable to use the same output devices for both the PWM operating mode and the linear operating mode.

However, when switching from PWM control to linear control, the response of the controller is disrupted by a discontinuity due to the change in the biasing scheme of the transistors in the output stage of the controller. In the linear mode, class-AB preamplifiers typically supply the drive signals to the output stages in fully-differential implementations and a class-A amplifier is used in single-ended applications, with the ideal bias points of the output transistors near their turn-on thresholds. In the PWM mode, pre-driver circuits supply the drive signals to the output stages that have stronger output drive capability to quickly charge and discharge the gates of the transistors in the output stages, typically to voltages near the power supply rails of the output stages. During the shift from PWM operation to linear operation, while feedback control can ultimately settle the output stage at the proper quiescent point for linear operation, the gates of the output transistors are initially charged to voltages substantially different from their respective turn-on thresholds and must settle to their near turn-on operating point as modified by whatever the output of the linear preamplifier commands according to the control input.

Therefore, it would be advantageous to operate a current-mode controller that may operate selectively in PWM mode or linear mode with reduced distortion during the shift from PWM mode to linear mode.

SUMMARY

Improved current-mode driver operation is accomplished in electronic control systems, integrated circuits including the control systems and their methods of operation.

The electronic control system provides selectable driving of a load in either a pulse-width modulated operating mode or a linear operating mode. The electronic control system includes an output stage for supplying the current to the load, which has a push-pull driver provided by a P-channel transistor coupled between a power supply rail and the load and an N-channel transistor coupled between a power supply return and the load. A mode selection control circuit selects between a pulse-width modulated mode and a linear mode of the electronic control system. The electronic control system also includes a pulse-width modulated output driver for providing pulse-width modulated control signals to the gates of the output stage transistors when the mode selection control circuit selects the pulse-width modulated mode and a linear amplifier stage that provide linear analog signals to the gates of the output stage transistors when the mode selection control circuit selects the linear operating mode. The electronic control system also includes a pre-charging circuit coupled to the gates of the output stage transistors and responsive to the mode selection control circuit that pre-charges the gates of the output stage transistors during a pre-charge cycle initiated when the mode selection control circuit changes the selected operating mode to the linear operating mode. In some embodiments, the pre-charging circuit may be provided by a portion of the pulse-width modulated output driver. In other embodiments, the pre-charging circuit is separate from the pulse-width modulated output driver.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DETAILED DESCRIPTION OF ILLUSTRATIVE EMBODIMENT

The present disclosure encompasses circuits and integrated circuits that include improved current-mode control systems and their method of operation. The electronic control systems include an output stage that supplies current to a load from a push-pull driver. A mode selection control circuit selects between a pulse-width modulated mode and a linear mode of the electronic control system. A pulse-width modulator output driver provides pulse-width modulated drive signals to the push-pull driver in a pulse-width modulated (PWM) operating mode and a linear amplifier stage provides linear analog signals to the push-pull driver in a linear operating mode. A pre-charging circuit pre-charges the gates of the transistors of the push-pull driver during a pre-charge cycle initiated when the operating mode changes from PWM to linear.

Figure 1:
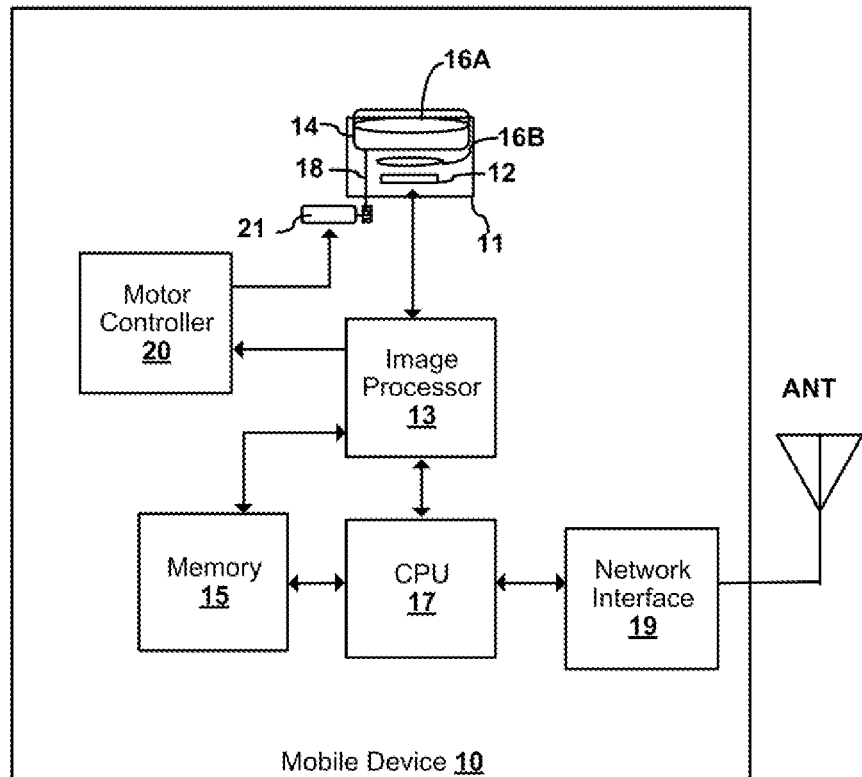
FIG. 1 is a block diagram illustrating a mobile device 10, in accordance with an embodiment of the disclosure.

Referring now to FIG. 1, a block diagram of an example mobile device 10 implementing an example electronic control system is shown, in accordance with an embodiment of the disclosure. Example mobile device 10 may be a wireless mobile telephone, tablet, notebook computer, or a similar device. Alternatively, mobile device may be a digital camera or other system that incorporates a position-controlled image sensor. Operation of mobile device 10 is controlled by a central processing unit (CPU) 17, which may be a microcontroller, microprocessor or other processor core, such as a processor core in a dedicated system-on-chip (SOC) implementation. CPU 17 is coupled to a memory 15 that stores program instructions forming a computer-program product, program data and other data such as media, including digital photographs. Memory 15 may include both non-volatile and dynamic storage elements. A network interface 19 provides for connection of mobile device 10 to a wireless network via an antenna ANT, but is not required for implementation of embodiments according to the disclosure, for example an electronic motor control system in a camera providing only a wired interface. A separate image processor 13 is also coupled to memory 15, and memory may comprise separate storage for program instructions forming another computer-program product, and data that may not be accessed directly by CPU 17. Image processor 13 provides an interface for receiving data from an image sensor 12 of a camera 11 within mobile device 10 and also provides an interface to a motor controller 20 that controls a motor 21 that positions a movable lens 16A, or multiple lenses, of camera 11, responsive to commands from image processor 13 that cause movement of a mount 14 via a mechanical linkage 18 coupled to motor 21. The commands are generally motor current commands to control the speed of the motor as computed by CPU 17 or image processor 13, which may provide zoom, auto-focus and image stabilization functions. Another fixed lens 16B receives an image from movable lens 16A to produce an image of the subject of a photograph or other image processing subject on image sensor 12.

Figure 2:
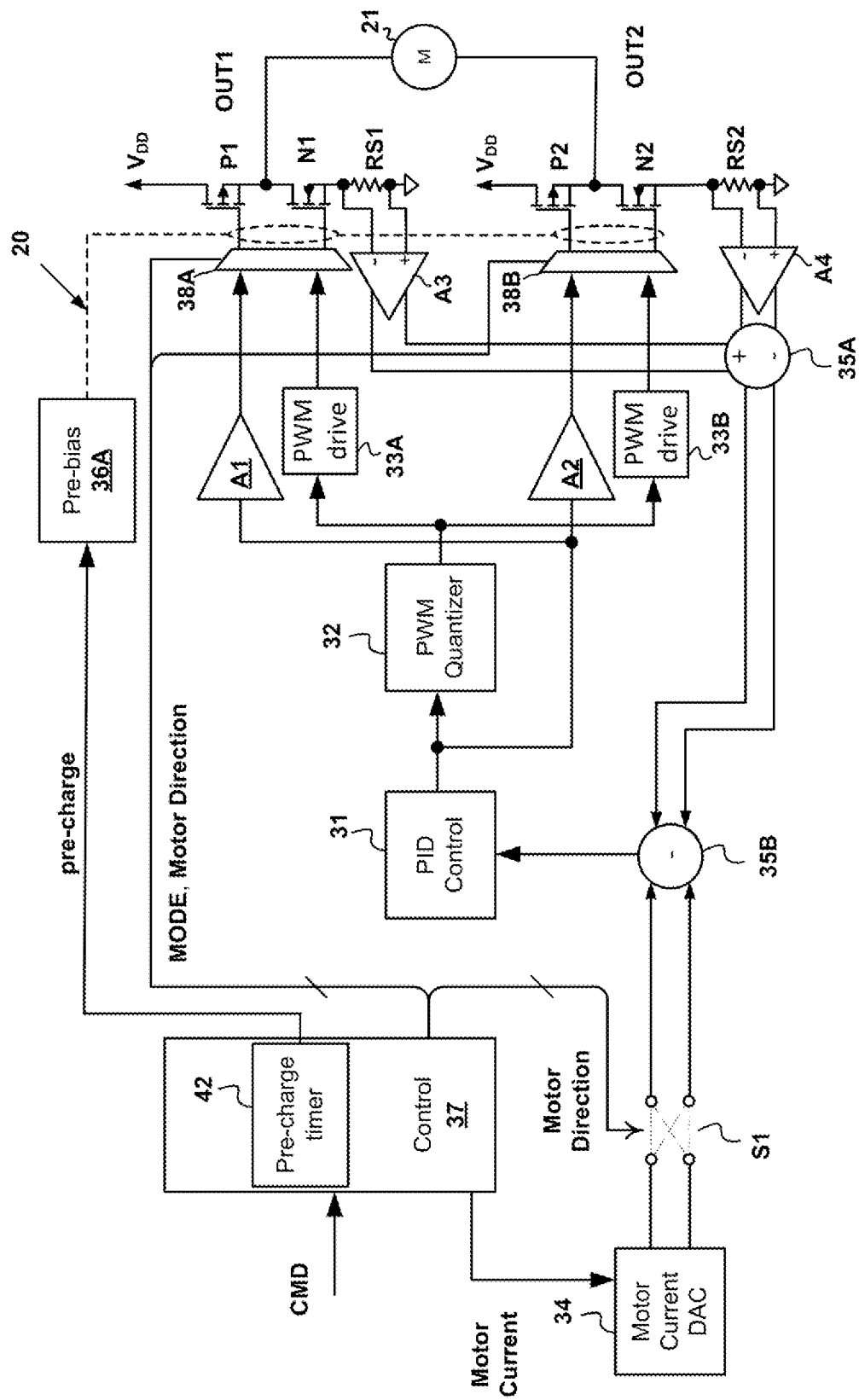
FIG. 2 is a simplified schematic diagram illustrating an example motor controller 20 of FIG. 1, in accordance with an embodiment of the disclosure.

Referring now to FIG. 2, a simplified schematic diagram of an example motor controller 20 that may be used to implement motor controller 20 of FIG. 1 is shown, in accordance with an embodiment of the disclosure. Each half of an H-bridge formed by transistors P1, P2, N1 and N2 includes a current sense resistor RS1, RS2 that provide sense voltage inputs to current monitoring fully-differential amplifiers A3 and A4, respectively. In the linear operating mode, the voltages across both sense resistors RS1, RS2 are measured by fully-differential amplifiers A3 and A4 and are subtracted by a combiner 35A, which causes cancelation of measured class-AB bias current conducted by both sides of the H-bridge, while the motor current remains in the measurement, since only one of transistors N1 or N2 is conducting the motor current. In some embodiments, as described in U.S. Patent Application Ser. No. 17/230,789 filed on Apr. 14, 2021, the disclosure of which is incorporated herein by reference, in PWM mode, the motor current may be sensed on the "sink" side, i.e., through the sense resistor RS1 or RS2 that is connected to one of transistors N1 or N2 that is turned on to sink current provided through motor 21 from the other side of the H-bridge. In such embodiments, the current is provided from a direction that is selected depending on the state of a control signal Motor Direction provided from a control circuit 37 and that selects one side of the H-bridge to operate statically, while the other side of the H-bridge is pulse-width modulated. In other embodiments, both sides of the H-bridge may be modulated. In either case, the pre-charge techniques described below will pre-charge the gates of transistors implementing both sides of the H-bridge to voltages near their respective turn-one voltages, e.g., $V_{DD}-V_{THP}$ for transistors P1 and P2, where $V_{THP}$ is the threshold voltage of transistors P1 and P2 and $V_{THN}$ for transistors N1 and N2, where $V_{THN}$ is the threshold voltage of transistors N1 and N2. For example, with a 3.3V power supply and $V_{THN}=V_{THP}=0.6V$, the gates of transistors P1 and P2 may be pre-charged to 2.7V and the gates of transistors N1 and N2 may be charged to 0.6V. Alternatively, the gates of transistors P1, N1, P2 and N2 may be set to a voltage approximating an expected value of the linear output signal to be generated $V_{oest}$, plus the threshold voltage for transistors N1 and N2 and to the approximate expected signal value plus $V_{DD}-V_{THP}$ for transistors P1 and P2. For example, according to the threshold voltage and $V_{DD}$ values in the above example, with an estimated signal value of +0.25V, the gates of transistors P1 and P2 may be pre-charged to 2.95V and the gates of transistors N1 and N2 may be charged to 0.825V. With an estimated signal value of −0.25V, the gates of transistors P1 and P2 may be pre-charged to 2.55V and the gates of transistors N1 and N2 may be charged to 0.35V.

Input to example motor controller 20, is provided from CPU 17 or image processor 13 of FIG. 1, or both, to control block 37. A motor current command, which is indicated by a command input CMD, includes a digital input value Motor Current provided to a motor current digital-to-analog converter (DAC) 34 that is coupled through cross-point switch S1, which interchanges the output signals of motor current DAC 34 to provide negative values corresponding to a reverse motor direction when control signal Motor Direction is asserted. Control signal Motor Direction, also provided by command input CMD, is sent to select linear or PWM operating mode to set the motor direction. Control signal Mode sets the PWM operating mode when asserted and sets the linear operating mode when de-asserted. Control signal Mode may be provided by command input CMD or may be originated in control block 37, e.g., in response to continuous detection of position error, so that linear mode may be entered when the position error is small.

A combiner 35B generates feedback signals from a differential output of combiner 35A, which is subtracted from the direction-corrected motor current command value provided from switch S1, also as a differential voltage, which sets a commanded motor current level by generating the output of combiner 35B as a motor current error level, i.e., the difference between the current being delivered to motor 21 and the current commanded by motor current DAC 34. The output of combiner 35B is provided as an input to a proportional integral-derivative (PID) control block 31. PID control block 31 corrects for the phase difference between the motor current through the inductive load of motor 21 and the voltage across motor 21, and generates an output that provides an input to a PWM quantizer 32, which generates PWM output signals that provide input to a pair of PWM drive blocks 33A and 33B. The outputs of PWM drive blocks 33A, 33B are provided as inputs to respective selector blocks 38A, 38B. Selector blocks 38A, 38B select between providing the output of one of PWM drive blocks 33A, 33B to a side of the H-bridge that is being modulated when a control signal MODE is asserted, while enabling the N-channel transistor N1 or N2 on the other side of H-bridge to conduct the current returning from motor 21 to the power supply return. The P-channel transistor P1 or P2 on the non-modulated side of the H-bridge is turned off by the corresponding one of selector blocks 38A, 38B or by an external pull-up configuration (not shown).

In the linear operating mode, as selected by control block 37 de-asserting control signal MODE, the outputs of both of a pair of linear driver amplifiers A1, A2 are coupled to their corresponding side of the H-bridge. Linear driver amplifiers A1, A2 also receive the output of PID control block 31, so that a common feedback loop may be shared between linear and PWM mode drive. Linear driver amplifiers A1, A2 have a gain that compensates for the difference between the single-ended PWM signal generated by only one half of the H-bridge vs. the differential signaling during operation of the H-bridge in linear mode, e.g., an attenuation of ½. Selector blocks 38A, 38B, also include the bias resistors or active bias circuits that bias transistors P1, P2, N1 and N2 to provide Class AB bias when linear mode is selected, i.e., all of transistors P1, P2, N1 and N2 conduct a bias current in addition to signal current. For single-ended operation, a class-A bias may be employed instead, for the single push-pull output stage implementing the single-ended output.

In addition to the bias current set during linear mode operation, pre-bias circuit 36A provides an additional charge to the gates of transistors P1, P2, N1 and N2 during a pre-charge interval controlled by a pre-charge timer 42 within control block 37. The pre-charge interval is commanded by a control signal pre-charge is initiated upon a change from PWM operating mode to linear operating mode, i.e., when mode control signal MODE is de-asserted. Pre-bias circuit 36A may set the gates of transistors P1, P2, N1 and N2 to a fixed bias voltage near their respective turn-one points, e.g., $V_{DD}-V_{THP}$ for transistors P1 and P2, where $V_{THP}$ is the threshold voltage of transistors P1 and P2 and $V_{THN}$ for transistors N1 and N2, where $V_{THN}$ is the threshold voltage of transistors N1 and N2. Alternatively, as will be described in further detail below, pre-bias circuit 36A may set the gates of transistors P1, P2, N1 and N2 to voltages dependent on a current or historical error signal level, i.e., the error signal at the output of PID control 31, to further reduce any change introduced by the switching of operating mode from PWM to linear mode.

Figure 3:
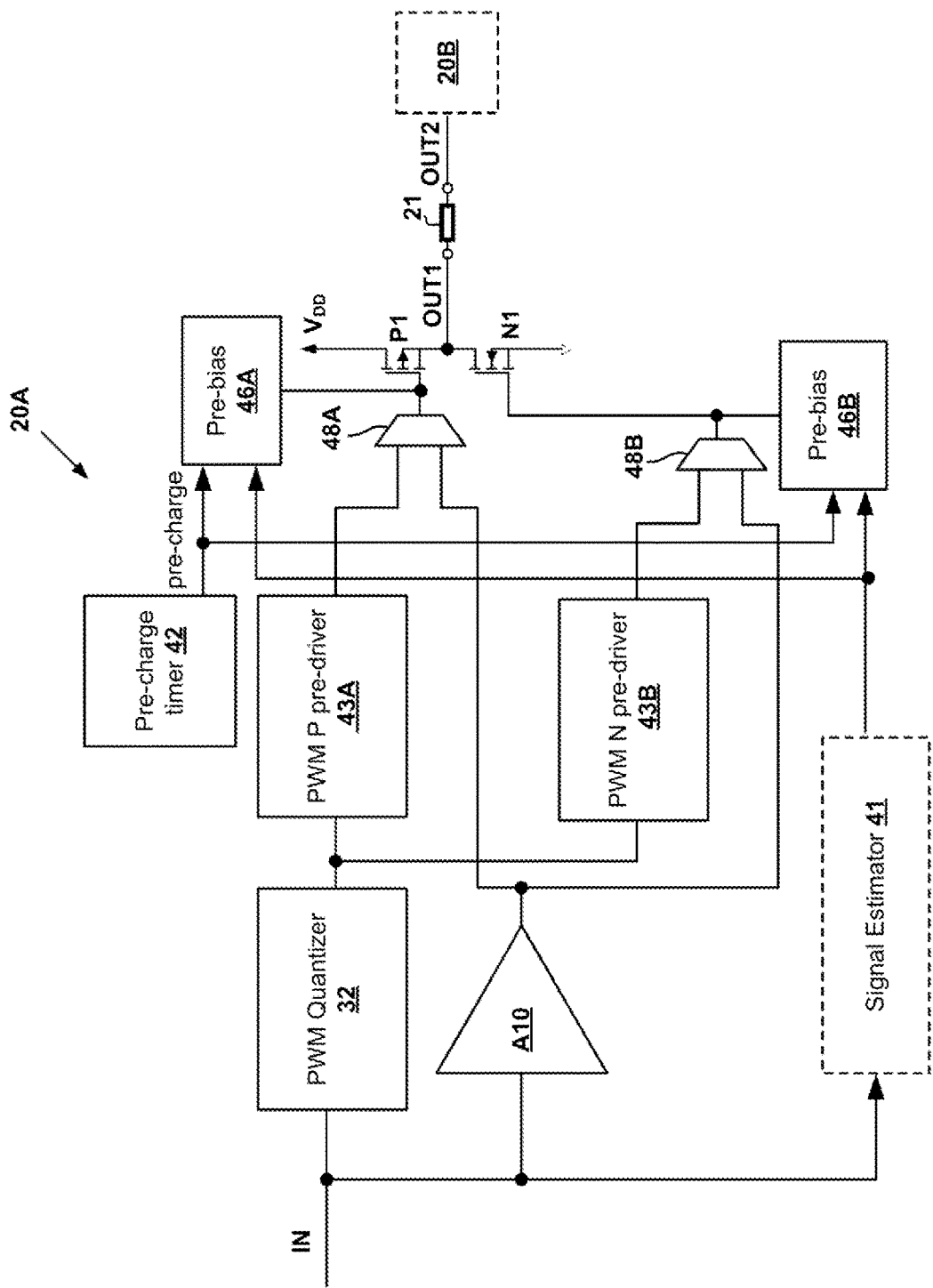
FIG. 3 is a simplified schematic diagram of an example motor controller output circuit 20A that may be used in motor controller 20 of FIG. 1 and FIG. 2, in accordance with an embodiment of the disclosure.

Referring now to FIG. 3, a simplified schematic diagram of a motor controller output circuit 20A that may be used in motor controller 20 of FIG. 1 and FIG. 2 is shown, in accordance with an embodiment of the disclosure. PWM quantizer 32 provides PWM drive signals to a pair of PWM pre-driver blocks 43A, 43B that provide PWM drive signals to corresponding output stage transistors P1 and N1, respectively, in the PWM operating mode. Selectors 48A and 48B, select between PWM and linear operating modes. When the linear operating mode is selected, an analog drive signal is provided from an amplifier A10, through selectors 48A, 48B. Pre-bias circuits 46A and 46B pre-charge the gates of transistors P1 and N1 when a pre-charge timer 42 asserts control signal pre-charge. The pre-bias voltages applied to the gates of transistors P1 and N1 may be set to the turn-on voltages of transistors P1 and N1 as described above, or an input provided from a signal estimator block 41 may be used to determine the pre-charge voltages according to a historical value of input signal IN, which may be the PID-adjusted error signal provided from the output of PID control block 31 of FIG. 2. Signal estimator 41 may be a polynomial interpolator with a delay calibrated to align the estimated signal with the linear analog signal provided to the gates of transistors P1 and N1 in the linear operating mode, or may be another element such as a low-pass filter with a calibrated delay. If the linear analog signal provided to the gates of transistors P1 and N1 leads the output of signal estimator 41, delays may be incorporated into PWM P Pre-driver 43A and PWM N pre-driver 43B. A second motor controller output circuit 20B, which is generally identical to motor controller output circuit 20A, and which may share common elements, such as PWM quantizer 32, provides another half of the H-bridge included in motor controller 20 of FIG. 2, which is shown in block 20B of FIG. 3 for simplicity of illustration. Pre-bias circuits 46A and 46B illustrate separate pre-bias circuits that apply the pre-charge voltages to transistors N1 and P1, rather than providing the pre-bias from PWM P Pre-driver 43A and PWM N pre-driver 43B, as in the example described below with reference to FIG. 4. By applying charge to the gates of transistors P1 and N1 during the pre-charge interval from pre-bias circuits 46A and 46B, after the pre-charge interval is complete, transistors P1 and N1 are controlled by the linear analog signal provided through selectors 48A and 48B, but without generating the transient that would be caused by the limited slew rate of amplifier A10, and the limited bandwidth of amplifier A10 including the current feedback loop through the current monitor of FIG. 2, to overcome the change in bias at transistors P1 and N1 required by the change to linear operating mode.

Figure 4:
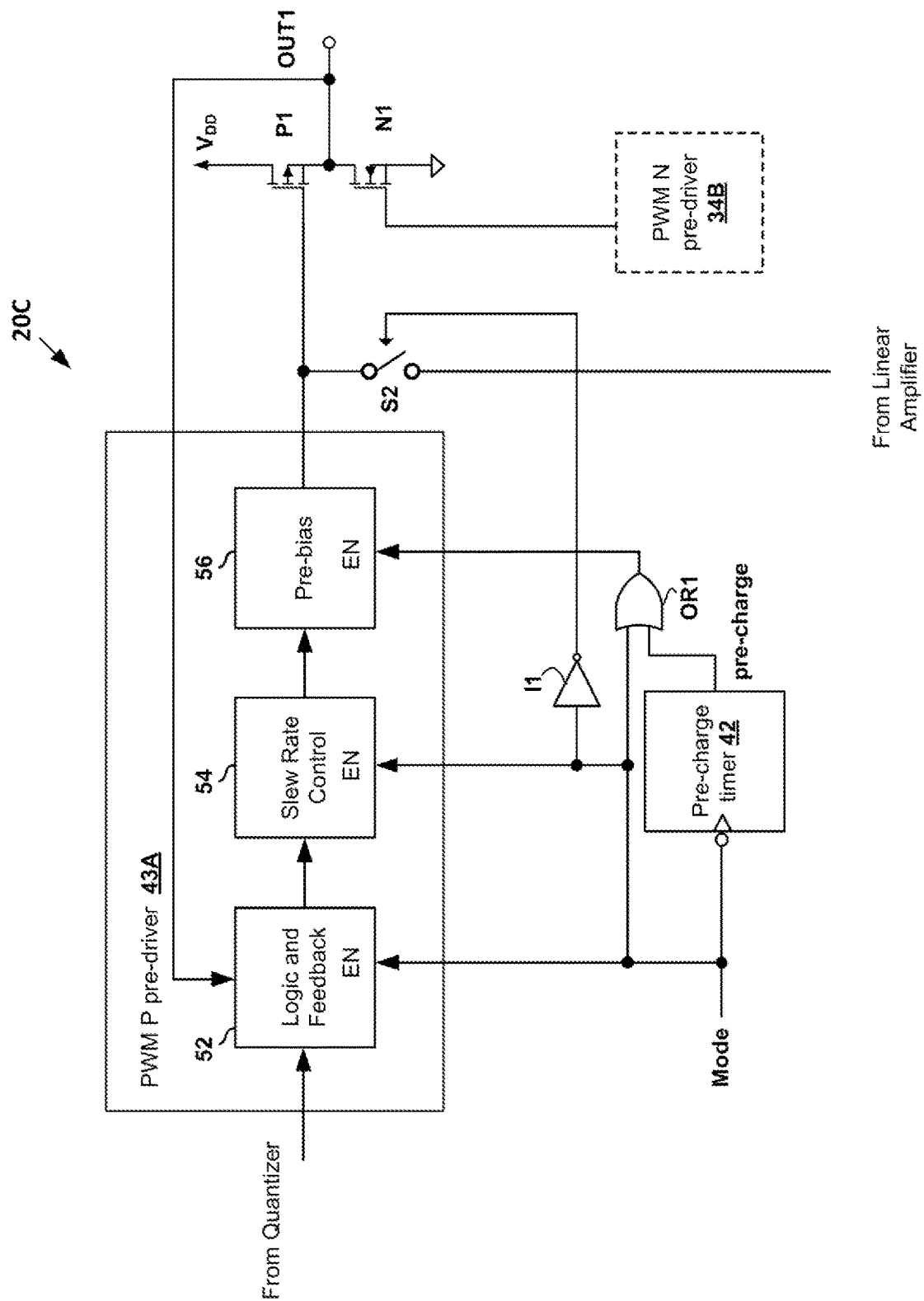
FIG. 4 is a simplified schematic diagram of an example motor controller output circuit 20B that may be used in motor controller 20 of FIG. 1 and FIG. 2, in accordance with another embodiment of the disclosure.

Referring now to FIG. 4, a simplified schematic diagram of another motor controller output circuit 20C that may be used in motor controller 20 of FIG. 1 and FIG. 2 is shown, in accordance with another embodiment of the disclosure. Motor controller output circuit 20C is similar to motor controller output circuit 20A of FIG. 3, so only differences between them will be described in detail below. For simplicity of illustration, only the details of PWM pre-driver block 43A are shown. PWM N pre-driver block 34B is similar to PWM pre-driver block 34A, except for the operating polarity and value of the pre-bias voltage applied by PWM N pre-driver block 34B. PWM pre-driver block 43A includes a logic and feedback block 52 that receives a logic level input from PWM quantizer 32 and generates drive signals according to the input from PWM quantizer 32 and feedback from the output provided by transistors P1 and N1. A slew rate control block 54 provides a slew-rate controlled output waveform generated from the output of logic and feedback block 52, generally by switching current sources having magnitudes tailored to the gate capacitances of transistors P1 and N1. A pre-bias block 45 receives the slew-rate controlled output waveform from slew rate control block 54 and adds a bias voltage to provide proper quiescent operating voltages to the gates of transistors P1 and N1 so that the midpoint of the output of slew rate control block 54 corresponds to the midpoint of the signal swing at the output provided at the source terminal of transistor P1.

A switch S2 enables the linear analog output of amplifier A10 onto the gate of transistor P1 when control signal Mode is de-asserted, thereby asserting the output of an inverter I1 that controls switch S2. PWM P pre-driver block 43A is not isolated by a switch/selector, because in the instant embodiment, each of the elements of PWM P pre-driver block 43A has an enable input EN that is used to disable the elements that produce the PWM drive signals during linear operating mode intervals and after the pre-charge cycle is complete. During the pre-charge cycle, as commanded by control signal pre-charge provided by a pre-charge timer 42, and which is initiated by the falling edge of mode control signal Mode triggering pre-charge timer 42, logical-OR gate OR1 enables enable input EN of pre-bias block 56 for a time period equal to the pre-charge interval timed by pre-charge timer 42, while mode control signal Mode disables logic and feedback block 52 and slew rate control block 54 to disable the PWM drive signals. Thus, during the pre-charge interval, only pre-bias block 56 remains active, and biases transistor P1 at the turn-on point, so that after the pre-charge interval is complete, transistor P1 is controlled by the linear analog signal provided through switch S2, but without generating the transient that would be caused by forcing the current feedback loop through the current monitor of FIG. 2 to overcome the change in bias at transistor P1 that would otherwise be caused by the change to linear operating mode. PWM N pre-driver block 34B acts in an identical manner with respect to applying the proper turn-on bias to transistor N1.

Figure 5:
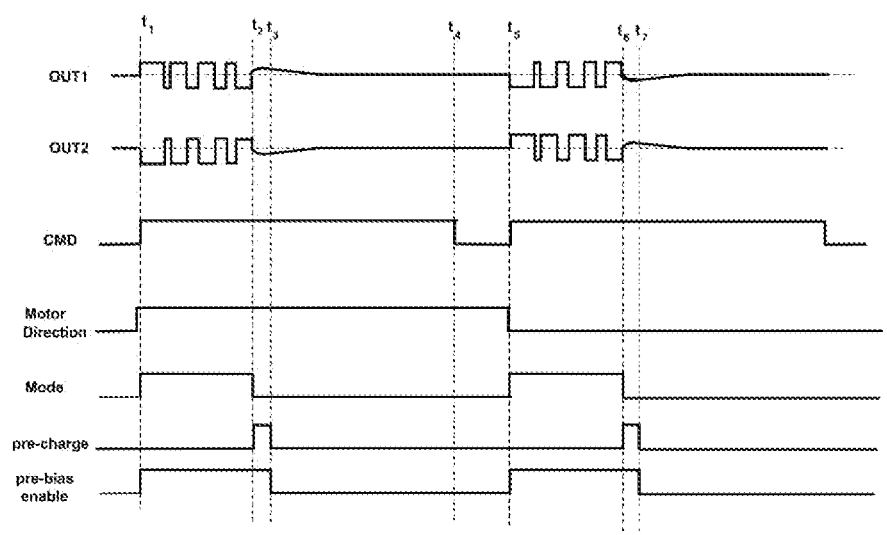
FIG. 5 is an example signal waveform diagram illustrating operation of motor control circuit 20 of FIG. 2, in accordance with an embodiment of the disclosure.

Referring now to FIG. 5, an example signal waveform diagram illustrating operation of example motor controller 20 of FIG. 2 is shown, in accordance with an embodiment of the disclosure. At time $t_1$, a lens position command is received, represented by signal CMD, which illustrates the time period during which the command is valid. Output terminal OUTM may be set to power supply rail $V_{SS}$ e.g., by turning transistor N2 on and transistor P2 off, in accordance with control signal Motor Direction, in an embodiment as exemplified by the above-incorporated U.S. Patent Application. Alternatively, Output terminal OUTM may also be pulse-width modulated. Output terminal OUTP is pulse-width modulated by operating transistors N1 and P1 according to the output of quantizer 32. At time $t_2$, control signal MODE is de-asserted, for example, when the position of motor 21 nears the commanded position and a command is received to change the operating mode to linear. A pre-charge cycle is initiated at time $t_2$, as indicated by assertion of control signal Pre-charge, and output terminal OUTP (and optionally output terminal OUTM) assume voltages corresponding to either a zero-output level, or corresponding to an estimated value of the desired linear output signal, depending on whether or not the bias voltage to which the gates of transistors P1, P2, N1 and N2 is based on an estimated signal level. After time $t_2$, motor controller 20 operates in linear mode and after time $t_3$, the pre-charging of the gates of transistors P1, P2, N1 and N2 is disabled, by de-asserting control signal Pre-charge. Waveform Pre-bias enable shows the period during which Pre-bias block 56 is enabled in the embodiment shown in FIG. 4, if the PWM pre-drivers are used to supply the pre-charge voltages during the pre-charge cycle. In the linear operating mode, output terminals OUTM and OUTP are both driven as the commanded position is reached and until the end of the control of position occurs at time $t_4$. At time $t_5$, another positioning command is received with an opposite state of control signal Motor Direction. Output terminal OUTM (and optionally output terminal OUTP) is pulse-width modulated by operating transistors N2 and P2 according to the output of quantizer 32. At time $t_6$, another pre-charge cycle is initiated by asserting control signal Pre-charge and motor controller 20 operates in linear mode, and output terminals OUTM and OUTP are both driven as the commanded position is reached. At time $t_7$, the pre-charge cycle is terminated by de-asserting control signal Pre-charge.

In summary, this disclosure shows and describes systems and integrated circuits implementing an electronic control system, and their methods of operation. The system includes an output stage for supplying the current to a load, which may be a motor, a haptic or another device. The electronic system may provide selectable driving of a load in either a pulse-width modulated operating mode or a linear operating mode, and may include an output stage for supplying current to the load. The output stage may include a push-pull driver provided by a P-channel transistor coupled between a power supply rail and the load and an N-channel transistor coupled between a power supply return and the load. The electronic system may include a mode selection control circuit for selecting between the pulse-width modulated operating mode and the linear operating mode as a selected operating mode, a pulse-width modulator output driver for providing pulse-width modulated drive signals to a gate of the P-channel transistor and a gate of the N-channel transistor, respectively, while the selected operating mode is the pulse-width modulated operating mode, and a linear amplifier stage for providing linear analog signals to the gates of the P-channel transistor and the N-channel transistor while the selected operating mode is the linear mode. The electronic control system may include a pre-charging circuit coupled to the gates of the P-channel transistor and the N-channel transistor and responsive to the mode selection control circuit for pre-charging the gates of the P-channel transistor and the N-channel transistor during a pre-charge cycle initiated when the mode selection control circuit changes the selected operating mode to the linear operating mode.

In some example embodiments, the electronic control system may include a feedback control loop having at least one input coupled to at least one of the first output or the second output that controls either a voltage provided to the load or a current provided to the load and that may provide feedback to an input stage that generates at least one of the linear analog signals and the pulse-width modulated drive signals. In some example embodiments, the mode selection control circuit may synchronize the pre-charge cycle to the pulse-width modulated drive signals. In some example embodiments, the pulse-width modulator output driver may include pre-bias circuits coupled to the gates of the N-channel transistor and the P-channel transistor for biasing the P-channel transistor and the N-channel transistor, and the pre-charging circuit may be supplied by the pre-bias circuit being activated during the pre-charge cycle. In some example embodiments, the pulse-width modulator output driver may be coupled to the mode selection control circuit to disable portions of the pulse-width modulator output driver other than the pre-bias circuit during the pre-charge cycle. In some example embodiments, the portions of the pulse-width modulator output driver other than the pre-bias circuit and the pre-bias circuit may both be disabled subsequent to the pre-charge cycle while the selected operating mode is the linear operating mode. In some example embodiments, wherein the pulse-width modulated output driver may include an input circuit for generating pulse-width modulated output signals from at least one logic-level input signal, a slew control circuit for generating slew-rate controlled drive signals from the pulse-width modulated output signals and the pre-bias circuit for applying bias voltages to the slew-rate controlled drive signals to generate the pulse-width modulated drive signals. In some example embodiments, in response to the mode selection control circuit selecting the pulse-width modulated operating mode, the input circuit, the slew control circuit and the pre-bias circuit may be enabled, in response to the mode selection control circuit selecting the linear operating mode, the input circuit and the slew control circuit may be disabled, and in response to the mode selection control circuit selecting the linear operating mode and the pre-charge cycle expiring, the pre-bias circuit may be disabled.

In some example embodiments, the pre-charging circuit may pre-charge the gates of the P-channel transistor and the N-channel transistor to pre-charge voltages determined in dependence on an input signal that provides an input to the linear amplifier stage. In some example embodiments, the pre-bias circuit may be a circuit separate from the pulse-width modulator output driver and coupled to the mode selection control circuit. In some example embodiments, the mode selection control circuit may only enable the pre-bias circuit during the pre-charge cycle. In some example embodiments, the electronic control system may include a switching circuit coupled to the mode selection control circuit that may selectively couple the pre-bias circuit to the input of the output stage during the pre-charge cycle.

It should be understood, especially by those having ordinary skill in the art with the benefit of this disclosure, that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense. Similarly, although this disclosure makes reference to specific embodiments, certain modifications and changes may be made to those embodiments without departing from the scope and coverage of this disclosure. Moreover, any benefits, advantages, or solutions to problems that are described herein with regard to specific embodiments are not intended to be construed as a critical, required, or essential feature or element.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to a control system for supplying signals to an audio transducer.

What is claimed is:

1. An electronic system providing selectable driving of a load in either a pulse-width modulated operating mode or a linear operating mode, the electronic system comprising:
   an output stage for supplying current to the load, the output stage having a push-pull driver provided by a P-channel transistor coupled between a power supply rail and the load and an N-channel transistor coupled between a power supply return and the load;
   a mode selection control circuit for selecting between the pulse-width modulated operating mode and the linear operating mode as a selected operating mode;
   a pulse-width modulator output driver for providing pulse-width modulated drive signals generated from one or more quantizer output signals to a gate of the P-channel transistor and a gate of the N-channel transistor, respectively, while the selected operating mode is the pulse-width modulated operating mode;
   a linear amplifier stage for providing linear analog signals to the gates of the P-channel transistor and the N-channel transistor while the selected operating mode is the linear mode; and
   a pre-charging circuit having outputs coupled to the gates of the P-channel transistor and the N-channel transistor and responsive to the mode selection control circuit for pre-charging the gates of the P-channel transistor and the N-channel transistor during a pre-charge cycle initiated when the mode selection control circuit changes the selected operating mode to the linear operating mode, wherein during the pre-charge cycle, the pulse-width modulated drive signals are not applied to the gate of the P-channel transistor and the gate of the N-channel transistor, so that the outputs of the pre-charging circuit are independent of the one or more quantizer output signals, and wherein the linear analog signals are applied to the gates of the P-channel transistor and the N-channel transistor along with the outputs of the pre-charging circuit.

2. The electronic system of claim 1, further comprising a feedback control loop having at least one input coupled to an output of the output stage, wherein the feedback control loop controls either a voltage provided to the load or a current provided to the load by providing feedback to an input stage that generates at least one of the linear analog signals and the pulse-width modulated drive signals.

3. The electronic system of claim 1, wherein the mode selection control circuit synchronizes the pre-charge cycle to the pulse-width modulated drive signals.

4. The electronic system of claim 1, wherein the pulse-width modulator output driver includes pre-bias circuits coupled to the gates of the N-channel transistor and the P-channel transistor for biasing the P-channel transistor and the N-channel transistor, and wherein the pre-charging circuit is supplied by the pre-bias circuit being activated during the pre-charge cycle.

5. The electronic system of claim 4, wherein the pulse-width modulator output driver is coupled to the mode selection control circuit to disable portions of the pulse-width modulator output driver other than the pre-bias circuit during the pre-charge cycle.

6. The electronic system of claim 5, wherein the portions of the pulse-width modulator output driver other than the pre-bias circuit and the pre-bias circuit are both disabled subsequent to the pre-charge cycle while the selected operating mode is the linear operating mode.

7. The electronic system of claim 4, wherein the pulse-width modulated output driver comprises an input circuit for generating pulse-width modulated output signals from at least one logic-level input signal, a slew control circuit for generating slew-rate controlled drive signals from the pulse-width modulated output signals and the pre-bias circuit for applying bias voltages to the slew-rate controlled drive signals to generate the pulse-width modulated drive signals.

8. The electronic system of claim 7, wherein in response to the mode selection control circuit selecting the pulse-width modulated operating mode, the input circuit, the slew control circuit and the pre-bias circuit are enabled, wherein in response to the mode selection control circuit selecting the linear operating mode, the input circuit and the slew control circuit are disabled, and wherein in response to the mode selection control circuit selecting the linear operating mode and the pre-charge cycle expiring, the pre-bias circuit is disabled.

9. The electronic system of claim 1, wherein the pre-charging circuit pre-charges the gates of the P-channel transistor and the N-channel transistor to pre-charge voltages determined in dependence on an input signal that provides an input to the linear amplifier stage.

10. The electronic system of claim 1, wherein the pre-bias circuit is a circuit separate from the pulse-width modulator output driver and coupled to the mode selection control circuit.

11. The electronic system of claim 10, wherein the mode selection control circuit only enables the pre-bias circuit during the pre-charge cycle.

12. The electronic system of claim 10, further comprising a switching circuit coupled to the mode selection control circuit that selectively couples the pre-bias circuit to the input of the output stage during the pre-charge cycle.

13. A method providing selectable driving of a load in either a pulse-width modulated operating mode or a linear operating mode in an electronic system, comprising:
supplying current to the load from an output stage having a push-pull driver provided by a P-channel transistor coupled between a power supply rail and the load and an N-channel transistor coupled between a power supply return and the load;
selecting between the pulse-width modulated operating mode and the linear operating mode as a selected operating mode;
providing pulse-width modulated drive signals generated from one or more quantizer output signals to a gate of the P-channel transistor and a gate of the N-channel transistor, respectively, only while the selected operating mode is the pulse-width modulated operating mode;
providing linear analog signals to the gates of the P-channel transistor and the N-channel transistor while the selected operating mode is the linear mode;
responsive to the selecting between the pulse-width modulated operating mode and the linear operating mode changing the selected operating mode from the pulse-width modulated operating mode to the linear operating mode, initiating a pre-charge cycle; and
pre-charging the gates of the P-channel transistor and the N-channel transistor during the pre-charge cycle, so that the pre-charging and the linear analog signals are applied to the gates of the P-channel transistor and the N-channel transistor during the pre-charge cycle, wherein during the pre-charge cycle, the pulse-width modulated drive signals are not applied to the gate of the P-channel transistor and the N-channel transistor, so that the outputs of the pre-charging circuit are independent of the one or more quantizer output signals, and wherein the linear analog signals are applied to the gates of the P-channel transistor and the N-channel transistor along with the pre-charging.

14. The method of claim 13, further comprising controlling either a voltage provided to the load or a current provided to the load by feedback provided to an input stage that generates at least one of the linear analog signals and the pulse-width modulated drive signals by a feedback control loop having at least one input coupled to an output of the output stage.

15. The method of claim 13, wherein the initiating of the pre-charge cycle is synchronized with the pulse-width modulated drive signals.

16. The method of claim 13, wherein the providing pulse-width modulated drive signals to a gate of the P-channel transistor and a gate of the N-channel transistor is performed by a pulse-width modulator output driver that includes pre-bias circuits coupled to the gates of the N-channel transistor and the P-channel transistor for biasing the P-channel transistor and the N-channel transistor, and wherein the pre-charging is performed by activating the pre-bias circuit during the pre-charge cycle.

17. The method of claim 16, further comprising disabling portions of the pulse-width modulator output driver other than the pre-bias circuit during the pre-charge cycle.

18. The method of claim 17, further comprising disabling both the portions of the pulse-width modulator output driver other than the pre-bias circuit and the pre-bias circuit subsequent to the pre-charge cycle while the selected operating mode is the linear operating mode.

19. The method of claim 17, further comprising:
generating pulse-width modulated output signals from at least one logic-level input signal by an input circuit of the pulse-width modulated output driver;
generating slew-rate controlled drive signals from the pulse-width modulated output signals by a slew control circuit; and
applying bias voltages to the slew-rate controlled drive signals to generate the pulse-width modulated drive signals by the pre-bias circuit.

20. The method of claim 19, further comprising:
in response to selecting the pulse-width modulated operating mode, enabling the input circuit, the slew control circuit and the pre-bias circuit;
in response to selecting the linear operating mode, disabling the input circuit and the slew control circuit; and
in response to selecting the linear operating mode and in response to the pre-charge cycle expiring, disabling the pre-bias circuit.

21. The method of claim 13, further comprising determining pre-charge voltages in dependence on an input that provides an input to a linear amplifier stage that provides the linear analog signals to the gates of the P-channel transistor and the N-channel transistor, and wherein the pre-charging pre-charges the gates of the P-channel transistor and the N-channel transistor to the pre-charge voltages.

22. The method of claim 13, wherein the providing pulse-width modulated drive signals to a gate of the P-channel transistor and a gate of the N-channel transistor is performed by a pulse-width modulator output driver and wherein the pre-charging is performed by a pre-bias circuit separate from the pulse-width modulator output driver.

23. The method of claim 21, wherein the pre-bias circuit is only enabled during the pre-charge cycle.

24. The method of claim 21, further comprising selectively coupling the pre-bias circuit to the input of the output stage during the pre-charge cycle.

* * * * *